United States Patent [19]

Kreeley

[11] 4,350,181
[45] Sep. 21, 1982

[54] VALVE COUPLING MEMBER

[75] Inventor: Bruce K. Kreeley, Bristol, Pa.

[73] Assignee: The Singer Company, Stamford, Conn.

[21] Appl. No.: 251,630

[22] Filed: Apr. 6, 1981

[51] Int. Cl.³ .................... F16L 37/28; F16K 31/126
[52] U.S. Cl. .................................. 137/614; 137/315; 251/5; 251/61.1; 285/131
[58] Field of Search ............... 137/614, 315; 251/5, 251/148, 61.1, 151; 285/131

[56] References Cited

U.S. PATENT DOCUMENTS

| | | | |
|---|---|---|---|
| 3,325,138 | 6/1967 | Connolly | 251/5 |
| 3,528,447 | 9/1970 | Kolb | 137/614 |
| 3,547,403 | 12/1970 | Graver | 251/315 |
| 3,836,113 | 9/1974 | Johnson | 251/5 |
| 4,050,669 | 9/1977 | Brumm | 251/61.1 |
| 4,300,748 | 11/1981 | Kreeley | 251/5 |

*Primary Examiner*—A. Michael Chambers
*Attorney, Agent, or Firm*—David L. Davis; Robert E. Smith; Edward L. Bell

[57] ABSTRACT

A coupling member adapted for joining in tandem a pair of axial flow valves includes a central hub region having back to back bosses extending longitudinally therefrom and a plurality of rib members extending radially therefrom. The spaces between the rib members provide a fluid flow path between the valve bodies. The interior of each of the bosses is hollow to provide means for communicating with the interior of the valve bodies.

5 Claims, 3 Drawing Figures

VALVE COUPLING MEMBER

DESCRIPTION

BACKGROUND OF THE INVENTION

This invention relates to valve couplers and, more particularly, to a coupling member adapted for joining in tandem a pair of axial flow valve bodies.

In my copending U.S. patent application Ser. No. 207,540, filed on Nov. 17, 1980, now U.S. Pat. No. 4,300,748 issued Nov. 17, 1981, I disclose an axial flow valve construction which includes a valve body and a pair of identical and interchangeable end closure members. The valve body includes a cylindrical opening defining the interior of the valve body, a first plurality of open channels extending from a first end of the valve body to the valve body interior and a second plurality of open channels extending from the valve body interior to the second end of the valve body. A flexible tubular sleeve is located within the cylindrical opening. The valve further includes means for providing external communication to the first plurality of open channels and means for providing external communication to the second plurality of open channels. Each of the end closure members includes means for providing a fluid path either from the fluid inlet to the first plurality of open channels or from the second plurality of open channels, to the fluid outlet, as well as means for providing external fluid communication to the interior of the sleeve.

For fluid flow reliability purposes, it is often desirable to have a pair of such valves connected in tandem. One way of accomplishing this result would be to have two complete valve assemblies connected by a length of pipe. This type of connection would require a total of two valve bodies, four end closure members and the length of connecting pipe. The two valve assemblies, each including a valve body and a pair of end closure members, would be shipped separately and assembled together with the connecting pipe on the site. This is not very economical from the point of view of the number of parts required, shipping costs, and assembly time.

It is therefore an object of the present invention to provide an economical arrangement for coupling in tandem a pair of axial flow valves.

SUMMARY OF THE INVENTION

The foregoing and additional objects are attained in accordance with the principles of this invention by providing a coupling member adapted for joining in tandem a pair of axial flow valve bodies each of the type having a first end, a second end, a cylindrical opening extending from the first end to the second end, the cylindrical opening defining the interior of the valve body, at least one first open channel extending from the first end to the valve body interior and at least one second open channel extending from the valve body interior to the second end, and a flexible tubular sleeve located within the cylindrical opening. The coupling member comprises a central hub region, sealing means on the central hub region for sealing the interior of each of the sleeves of the valve bodies from the open channel of the corresponding one of the valve bodies, and means for providing a fluid path between the first open channel of one of the valve bodies and the second open channel of the other of the valve bodies.

Accordingly, the coupling member eliminates the requirement for two end closure members and a connecting pipe and also allows a completely assembled tandem pair of axial flow valves to be shipped as a single unit.

BRIEF DESCRIPTION OF THE DRAWINGS

The foregoing will be more readily apparent upon reading the following description in conjunction with the drawings wherein.

DETAILED DESCRIPTION

Figure 1:
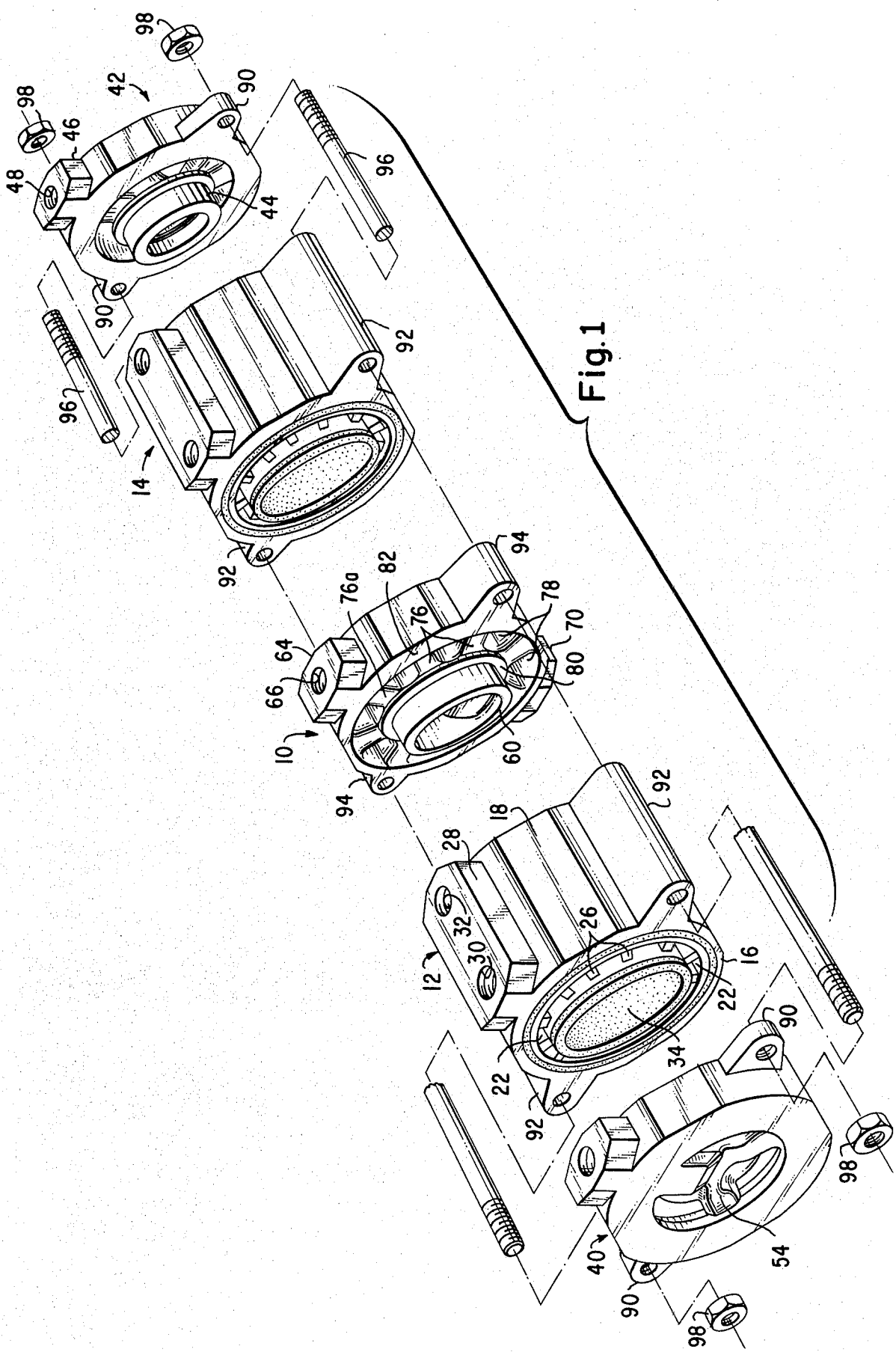
FIG. 1 is an exploded perspective view of a complete assembly of a pair of axial flow valves joined in tandem by means of a coupling member constructed in accordance with the principles of this invention.
Figure 3:
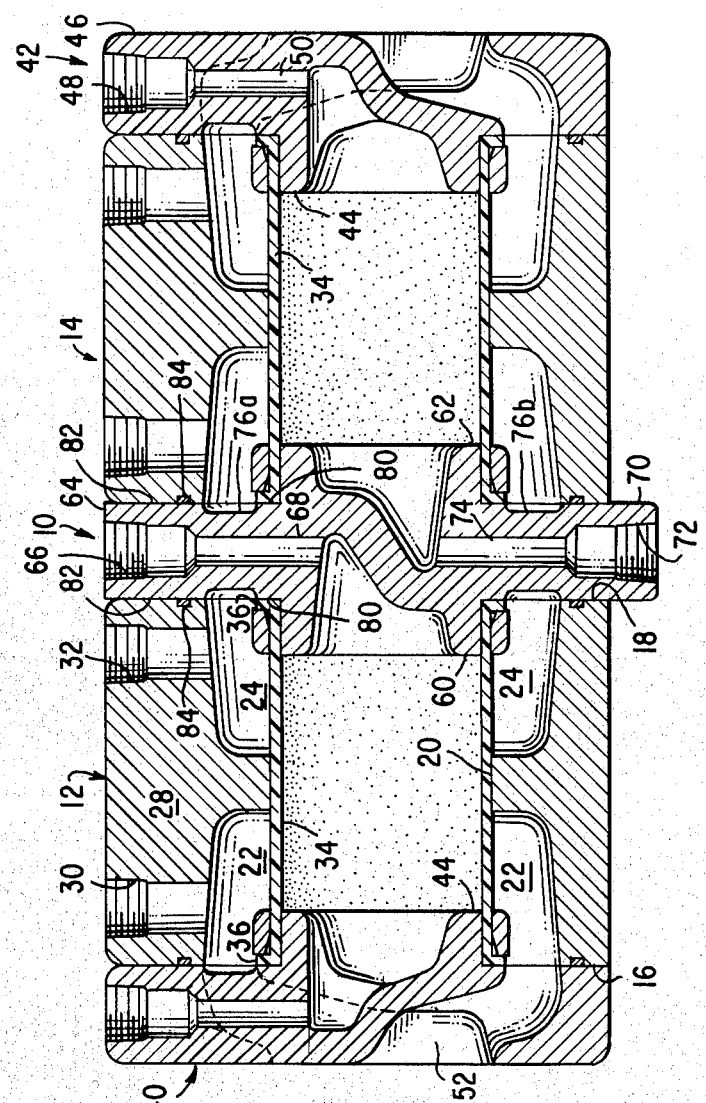
FIG. 3 is a vertical longitudinal section of the complete assembly shown in FIG. 1.
Figure 2:
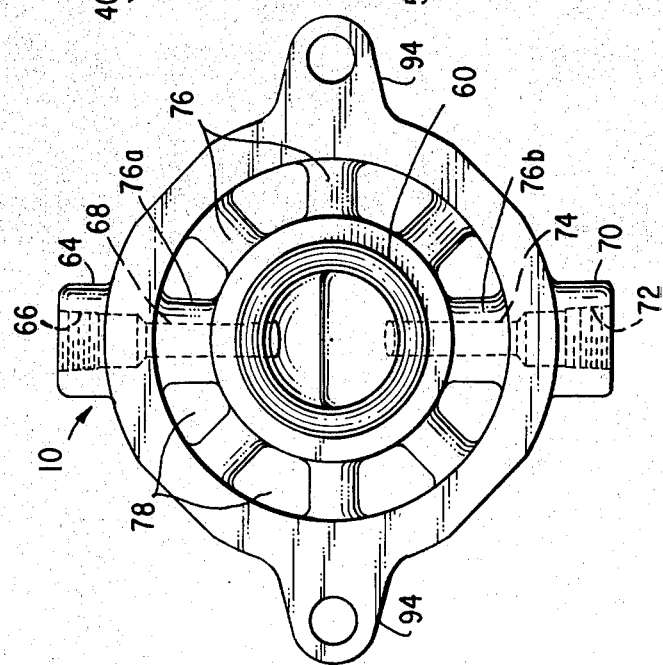
FIG. 2 is an end view of the coupling member of this invention.

Referring now to the drawings, wherein like elements in different figures thereof of the same reference character applied thereto, FIG. 1 shows a coupling member 10 constructed in accordance with the principles of this invention for joining in tandem a pair of valve bodies 12 and 14 of the type described in the above-referenced copending U.S. patent application. The valve bodies 12 and 14 are identical in construction and, accordingly, a description of valve body 12 will also serve as a description of identical valve body 14. Valve body 12 has a first end 16, a second end 18 and is formed with a cylindrical opening 20 extending from the first end 16 to the second end 18. The cylindrical opening 20 thus defines the interior of the valve body 12. Also formed within the valve body 12 is a first plurality of open channels 22 extending from the first end 16 to the interior of the valve body 12, and a second plurality of open channels 24 extending from the interior of the valve body 12 to the second end 18. The first plurality of open channels 22 are angularly spaced about the cylindrical opening 20 and are separated by a first plurality of ribs 26. Thus, as is clear from FIG. 3, each of the first plurality of open channels 22 enters the valve body 12 from the first end 16 in a direction which is generally parallel to the longitudinal axis of the cylindrical opening 20 and then bends before entering the cylindrical opening 20. The second plurality of open channels 24 are identical in form to the channels 22, also being separated by a plurality of ribs.

Mounted on the valve body 12 is a manifold 28 including a first port 30 which provides external communication to the first plurality of open channels 22. The manifold 28 also has a second port 32 which provides external communication to the second plurality of open channels 24.

The valve body 12 further includes a flexible tubular sleeve 34 which is located within the cylindrical opening 20. The outer diameter of the sleeve 34 is substantially equal to the diameter of the cylindrical opening 20. Preferably, the sleeve 34 is formed with a flange 36 at each end thereof. The assembled valve pair further includes a pair of identical and interchangeable end closure members 40 and 42 each of which is adapted to cover either the first end 16 of the valve body 12 or the second end of the valve body 14. The end closure member 42 includes a boss 44 adapted to extend into the interior of the sleeve 34. The outer configuration of the boss 44 conforms to the inner configuration of the sleeve 34 so as to provide a snug fit therewith. The interior of the boss 44 is hollow and the end closure member 42 also includes a manifold 46 having a port 48 and a conduit 50 extending from the port 48 to the hollow interior of the boss 44. Thus, the end closure member 42 includes means providing external fluid communication to the interior of the sleeve 34.

The end closure members 40 and 42 also each include means for providing a fluid path to the respective open channels of the valve bodies to which they are in contact. Accordingly, the end closure member 40 is formed with passageways 52 which extend from the side opposite the boss 44 and fan outwardly to meet the open channels 22. A spider 54 defines these passageways, provides support for the boss 44 and provides structure through which the conduit 50 may pass.

In accordance with the principles of this invention, a coupling member 10 is provided which takes the place of a pair of end closure members and an intermediate length of pipe. Accordingly, the coupling member 10 includes a central hub region from which a pair of back to back bosses 60 and 62 extend longitudinally into the interior of the sleeves 34, the outer configuration of the bosses 60, 62, conforming to the inner configuration of the sleeves 34 so as to provide a snug fit therewith and seal the sleeve interior from the open channel of the corresponding valve body. The interiors of the bosses 60, 62, preferably are hollow and the coupling member 10 preferably includes a first manifold 64 having a first port 66 and a first conduit 68 extending from the port 66 to the interior of the boss 64, and a second manifold 70 having a second port 72 and a second conduit 74 extending from the port 72 to the interior of the boss 62. Thus, the coupling member 10 includes means for providing external fluid communication independently to the interiors of the sleeves of both axial flow valve bodies 12 and 14.

The coupling member 10 is provided with a plurality of spaced rib members 76 which extend radially from the central hub region including the back to back bosses 60 and 62 to the outer periphery of the coupling member 10. The open spaces 78 between the ribs 76 form passageways which provide a fluid path between the open channels of the valve bodies 12 and 14. In addition, one of the ribs 76a provides structure for containing the conduit 68 and another of the ribs 76b provides structure for containing the conduit 74.

On each side of the coupling member 10 there is provided an annular flat inner machined surface 80 surrounding the bosses 60, 62, and an outer annular flat machined area 82 along the periphery of the coupling member 10 and past the region containing the ribs 76. These flat surface areas assist in sealing the open channels from the sleeve interiors. When the entire assembly shown in FIG. 1 is put together, the flanged ends 36 of the sleeves 34 bear against the region 80 to provide a seal between the sleeve interior and the open channels. To seal the open channels from the exterior of the assembly, the valve bodies 12 and 14 are formed with annular grooves adapted to receive O-rings 84 which bear against the surfaces 82 to provide a seal therewith.

To hold together the end closure members 40, 42, the valve bodies 12, 14, and the coupling member 10, the end closure members 40 and 42 are formed with a pair of diametrically opposed ears 90, the valve bodies 12 and 14 are formed with a pair of diametrically opposed ears 92, and the coupling member 10 is formed with a pair of diametrically opposed ears 94. The ears 90, 92, 94, are formed with longitudinal openings therethrough which are adapted to be aligned when the entire assembly is put together. A pair of end threaded rods 96 then pass through these longitudinal openings and are capped by nuts 98.

Accordingly, there has been disclosed a coupling member adapted for joining in tandem a pair of axial flow valve bodies. The single coupling member replaces a pair of end closure members and a length of connecting pipe and allows a pair of valves to be shipped as a single unit. It is understood that the above-described embodiment is merely illustrative of the application of the principles of this invention. Numerous other embodiments may be devised by those skilled in the art without departing from the spirit and scope of this invention, as defined by the appended claims.

I claim:

1. A coupling member adapted for joining in tandem a pair of axial flow valve bodies each of the type having a first end, a second end, a cylindrical opening extending from said first end to said second end, said cylindrical opening defining the interior of said valve body, at least one first open channel extending from said first end to said valve body interior and at least one second open channel extending from said valve body interior to said second end, and a flexible tubular sleeve located within said cylindrical opening, said coupling member comprising:

a central hub region;

sealing means on said central hub region for sealing the interior of each of the sleeves of said valve bodies from the open channel of the corresponding one of said valve bodies; and means for providing a fluid path between the first open channel of one of said valve bodies and the second open channel of the other of said valve bodies.

2. The coupling member according to claim 1 wherein said sealing means includes a pair of bosses each adapted to extend into the interior of the sleeve of one of said valve bodies, the outer configuration of each of said bosses conforming to the inner configuration of its respective sleeve so as to provide a snug fit therewith.

3. The coupling member according to claim 1 wherein for each of said valve bodies said at least one first open channel comprises a first plurality of open channels angularly spaced about the cylindrical opening and said at least one second open channel comprises a second plurality of open channels angularly spaced about the cylindrical opening, said coupling member including a plurality of spaced rib members extending from said central hub region to the periphery of said coupling member, there being open spaces between adjoining rib members, which open spaces comprise the means for providing a fluid path between the first open channel of one of the valve bodies and the second open channel of the other of the valve bodies.

4. The coupling member according to claim 1 further including means for providing external fluid communication to the interior of the sleeve of said one valve body and means for providing external fluid communication to the interior of the sleeve of the other valve body.

5. The coupling member according to claim 1 wherein for each of said valve bodies said at least one first open channel comprises a first plurality of open channels angularly spaced about the cylindrical opening and said at least one second open channel comprises a second plurality of open channels angularly spaced about the cylindrical opening, said sealing means includes a pair of bosses each adapted to extend into the interior of the sleeve of one of said valve bodies, the outer configuration of each of said bosses conforming to the inner configuration of its respective sleeve so as to provide a snug fit therewith, said coupling member further including a plurality of spaced rib members extending from said central hub region to the periphery of said coupling member, there being open spaces between adjoining rib members, which open spaces comprise the means for providing a fluid path between the first open channel of one of the valve bodies and the second open channel of the other of the valve bodies, and said coupling member further comprising means for providing external fluid communication to the interior of the sleeve of said one valve body including a first manifold having a first port and a first conduit extending from said first port through a first one of said rib members to one of said bosses and means for providing external fluid communication to the interior of the sleeve of the other valve body including a second manifold having a second port and a second conduit extending from said second port through a second one of said rib members to the other of said bosses.

* * * * *